(No Model.)

S. F. CLOUSER.
LOCK-UP NUT.

No. 449,069. Patented Mar. 24, 1891.

Witnesses
John Buckler,
E. B. Barnum

Inventor:
Samuel F. Clouser

UNITED STATES PATENT OFFICE.

SAMUEL F. CLOUSER, OF BROOKLYN, ASSIGNOR OF FIFTY-ONE ONE-HUNDREDTHS TO RICHARD N. PETERSON, OF NEW YORK, N. Y.

LOCK-UP NUT.

SPECIFICATION forming part of Letters Patent No. 449,069, dated March 24, 1891.

Application filed October 13, 1890. Serial No. 368,021. (No model.)

*To all whom it may concern:*

Be it known that I, SAMUEL F. CLOUSER, a citizen of the United States, residing at Brooklyn, in the county of Kings and State of New York, have invented certain new and useful Improvements in Lock-Up Nuts; and I do hereby declare the following to be a full, clear, and exact description of the invention, such as will enable others skilled in the art to which it appertains to make and use the same, reference being had to the accompanying drawings, wherein—

Figure 1:
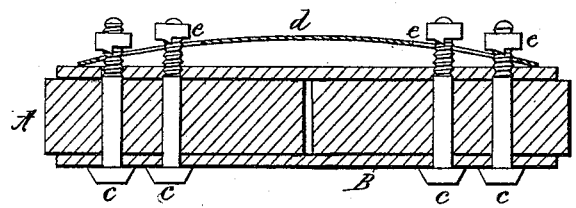
Figure 2:
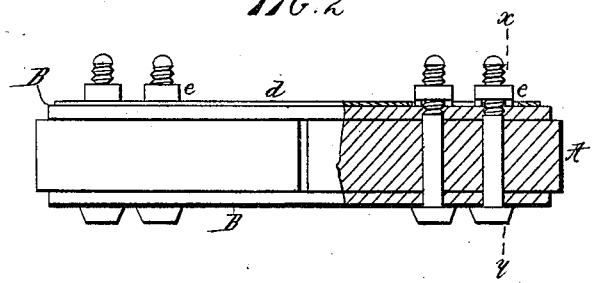
Figure 3:
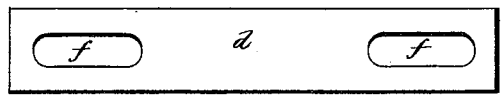
Figure 4:
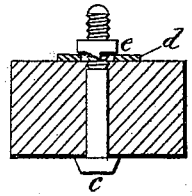
Figure 5:
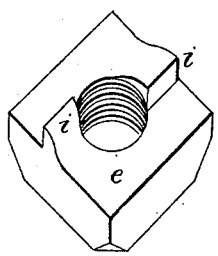

Figure 1 is a horizontal sectional view of the ends of two rails fastened by fish-plates, also in section, with the bolts and nuts connecting the same and my spring-washer, also in section, before being driven home. Fig. 2 is a broken section of the same, showing the nuts driven home. Fig. 3 is a top view of my spring-washer as applied to fish-plates. Fig. 4 is a cross-section of Fig. 2 connecting the fish-plates, taken on the line *x y*. Fig. 5 is a plan view of my ratchet-nut, and Fig. 6 a sectional view of my spring-washer and ratchet-nut when used with a single bolt.

My invention relates to a lock-up nut, and is more especially shown and will be described as applied to fish-plates; and it consists in the use of a spring-slotted washer securely anchored and a nut provided on its under side with a ratchet-tooth or similar device calculated to engage within the slot when driven to its seat.

Similar letters indicate similar parts in all the figures.

In the drawings, A A represent two rails end to end, with fish-plates B B lapping the joint and secured by bolts *c c*. Over the screw ends of the bolts I place a washer *d* slotted, the slots *f f* having one or more straight sides. This washer may be a simple flat spring, and the size of the slot will depend on the size and position of the ratchet tooth or teeth on the nut and allowing for expansion and contraction. The nut *e* resembles any ordinary nut, except that on its under or bearing surface it is provided with shoulders or lugs, pins, or similar devices, which may be struck from or attached to it, their shape being immaterial except that they must be so constructed that they will bear firmly against the side or sides of the slot in the washer. When these nuts are driven home they carry with them the spring-washer into which the teeth of the nut engage, and the tendency of the spring of the washer being outward toward the nut, they cannot disengage by any jar, vibration, or other ordinary disturbing motion. The nut is thus tightly locked.

Figure 6:
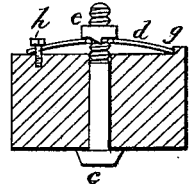

The anchoring of the washer, as shown in Figs. 1 and 2, is accomplished by the use of several bolts and nuts and corresponding slots in the washer; but where a single bolt and nut is to be used, as shown in Fig. 6, the anchoring can be accomplished by the use of shoulders *g*, against which its edges may rest or by screws *h* or pins, or any other equivalent means, the only object of anchoring the washer being, as will readily be seen, to prevent its turning with the nut.

If screws or pins are used, the heads may be covered by the nut, so they cannot be displaced, and the shoulders or depressions may be also so covered.

I am aware that a curved spring-plate having corrugated or serrated projections around the bolt-hole adapted to frictionally retain the nut in place has heretofore been devised, and that it is also old in the art to provide a nut with lugs or projections on its inner face which adapt themselves to corresponding holes in a metal washer backed by an elastic washer, and also that elastic or yielding locking-washers, such as is disclosed in patent to Harmon, No. 339,880, dated April 13, 1886, are old; and I am also aware that it is old to use a washer having longitudinal grooves which are adapted to receive the inwardly-projecting lugs of a second washer, which in turn is provided with an oblong hole into which a corresponding oblong part on the inner face of the nut is adapted to fit, and I make no claim herein broad enough to include any of such construction.

Having described my invention, what I claim to be new is—

1. In a nut-lock, the combination of the following elements: a screw-bolt, a spring-washer having an oblong slot of greater length than the diameter of the bolt, and a nut provided with a tooth or teeth adapted to take against the inner faces of the slot, substantially as described.

2. The combination of the following elements: one or more fish-plates, a pair of rails provided with bolt-holes near their ends, two or more bolts, a spring-washer made of a single piece of metal and having an oblong slot for each bolt, and a nut for each bolt, provided with teeth or lugs adapted to take against the inner faces of the slots as the nuts are driven home, substantially as described.

3. The combination of the following elements: a spring-washer having two or more oblong slots located in the direction of its length, two or more bolts, one for each slot, a pair of rails provided with bolt-holes corresponding to the bolts, one or more fish-plates, and nuts for each bolt, each of said nuts being provided with a pair of inclined teeth or lugs having faces adapted to take against the opposite walls of the slots, substantially as shown.

In testimony whereof I affix my signature in presence of two witnesses.

SAMUEL F. CLOUSER.

Witnesses:
 EDMUND A. HOLTON,
 E. B. BARNUM.